Oct. 16, 1934.  C. SCHAER  1,977,407
CONTROL APPARATUS FOR VEHICLES OF THE DIESEL ELECTRIC TYPE
Filed Nov. 3, 1932
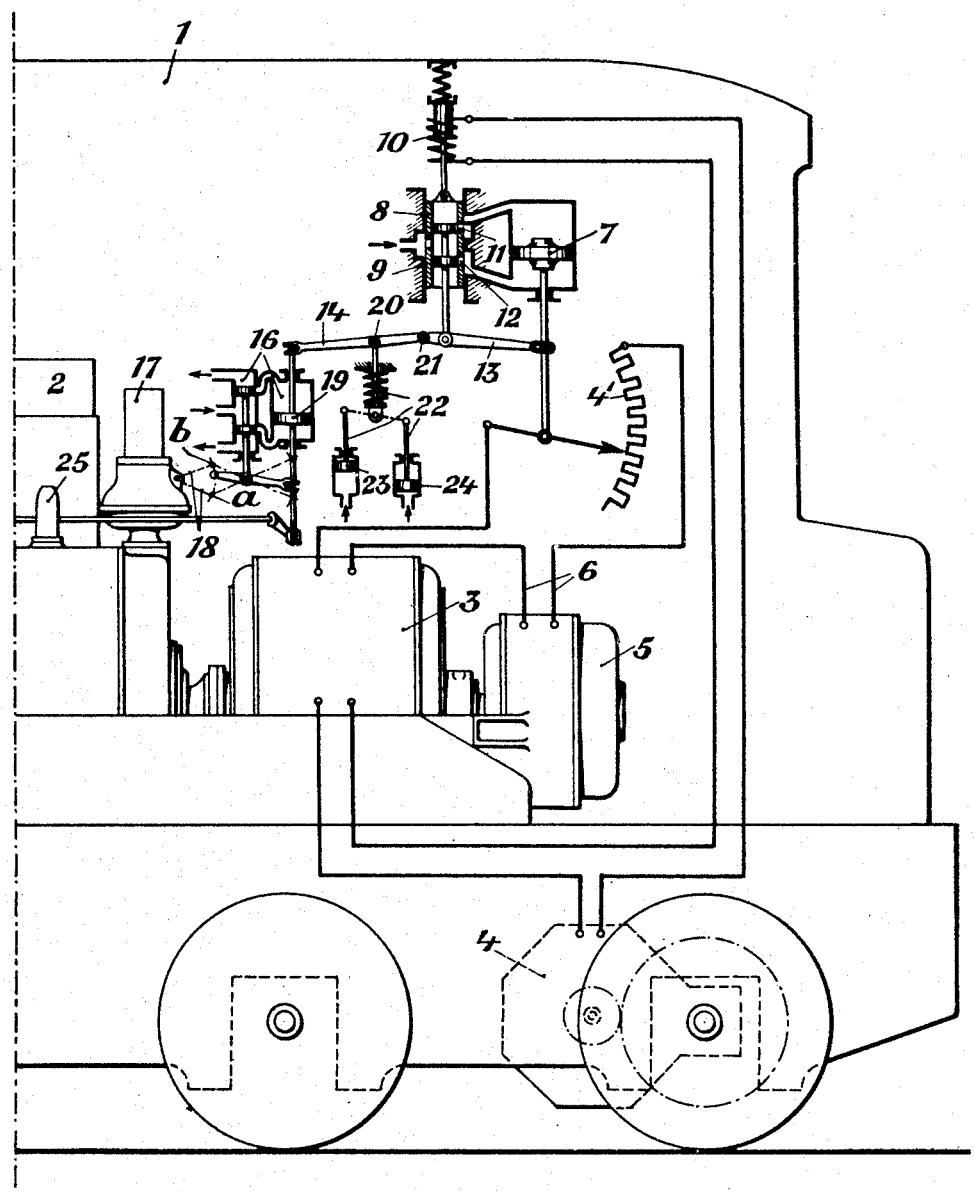
INVENTOR:
Charles Schaer
BY
Pennie, Davis, Marvin & Edmonds
ATTORNEY.

Patented Oct. 16, 1934

1,977,407

UNITED STATES PATENT OFFICE 1,977,407

CONTROL APPARATUS FOR VEHICLES OF THE DIESEL ELECTRIC TYPE

Charles Schaer, Langenthal, Switzerland, assignor to firm Sulzer Frères Societe Anonyme, Winterthur, Switzerland Application November 3, 1932, Serial No. 641,022
In Switzerland November 24, 1931

4 Claims. (Cl. 290—17)

This invention relates to control apparatus for locomotives of the Diesel-electric type and has as its object to provide apparatus for maintaining the tractive effort on the locomotive substantially constant at a certain value which can be adjusted irrespective of the speed of the vehicle so as to maintain a substantially constant load on the Diesel engine. If for this purpose the generator voltage were to be controlled solely by the speed governor of the Diesel engine, irregular fluctations in the tractive effort of the vehicle would result owing to the frequent hunting of the speed governor.

In the improved control apparatus according to this invention the voltage of the generator which supplies electric current to the traction motor or motors is controlled automatically in accordance with the speed of the vehicle.

The voltage of the generator may also be controlled by the speed governor of the engine and in one preferred arrangement a variable resistance in the excitation circuit of the main generator is actuated by a power-operated piston having a valve with two regulating members one of which is controlled automatically in accordance with the speed of the vehicle and the other of which is controlled by the Diesel engine speed governor.

The following is a description by way of example of one arrangement according to this invention with reference to the accompanying drawing which shows part of a locomotive and the control apparatus somewhat diagrammatically.

As shown in this drawing the body 1 of the locomotive carries a Diesel engine 2 which is directly coupled to a main generator 3 and an auxiliary excitation generator 5. The main generator supplies current to the traction motor 4 and has its field energized from the auxiliary generator 5 through the supply leads 6 and a variable resistance 4'.

The variable resistance 4' is controlled by a power-operated piston 7 mounted in a cylinder the ports of which are controlled by a valve having two regulating members consisting of a sleeve 8 and a piston 9. The sleeve 8 is connected to the plunger of an electromagnet 10, the coil of which is connected in series with the traction motor 4, so that the sleeve 8 is moved in accordance with the voltage of the generator and also in accordance with the speed of the vehicle, a spring is provided which tends to maintain the sleeve 8 in its raised position. The sleeve is provided with ports 11 and 12 which cooperate with the valve piston 9 to control the admission of pressure fluid above and below the piston 7. The valve piston 9 is connected to a floating lever 13 which has one end connected to the piston 7 and the other end pivoted at 21 to one end of a lever 14, the point 21 normally acting as the pivot of the lever 13.

The lever 14 is pivoted at 20 and has its other end connected to the piston 19 of a fluid-operated device 16 which is actuated by the governor 17 of the Diesel engine. The governor lever, indicated in chain lines at 18, is in the position $a$, when the engine is running idle and moves to the position $b$ when the engine is fully loaded, thereby lowering the piston 19. The position of the pivot 20 of the lever 14 is adjusted in the usual way from the driver's stand by means of the device 22 which is provided with fluid-operated pistons 23 and 24, either or both of which can be operated to move the pivot 20 upwardly against the pressure of a spring. The operating piston 19 is also utilized to control the fuel pump 25 of the engine 2.

The operation of the apparatus is as follows.

When, for example, the locomotive reaches a steep grade its speed tends to decrease so that the current taken by the motor 4 and also the tractive effort increase. The increased current passing through the coil of the electromagnet 10 causes the armature of this magnet to move downwardly carrying with it the sleeve 8 so that pressure fluid is admitted to the upper side of the piston 7 and the lower side of this piston is connected to exhaust. The piston 7 then moves downwardly to increase the value of the variable resistance 4' so that the excitation current of the generator 3 is reduced and, the voltage of the generator falling, a corresponding reduction is effected in the current taken by the traction motor 4. In its downward movement the operating piston 7 carries with it the valve piston 9 thus closing the ports 11 and 12 in the sleeve 8. Since the current taken by the traction motor 4 depends upon the relationship between the voltage of the generator and the speed of the motor, i. e. the speed of the vehicle, it will be apparent that the control arrangement operates to vary the voltage of the generator 3 in accordance with the variations in speed of the vehicle and that this variation is effected without any substantial time delay or lag as would be necessary were it effected solely by the governor 17.

If the position of the governor 17 changes, due for example to the failure of one cylinder of the Diesel engine and consequent drop in speed of the engine, the downward movement of the operating piston 19 causes an upward movement of the pivot 21 of the floating lever 13 thus causing the valve piston 9 to move upwardly to admit pressure fluid above the operating piston 7 and to connect the lower side of this piston to exhaust. The operating piston 7 then moves downwardly to increase the value of the resistance 4' and thus to decrease the tractive effort of the vehicle; no overloading of the engine, can happen.

The device 22 which is controlled from the driver's stand, enables the lever 14 to be set so that the value at which the load is maintained substantially constant by the control apparatus can be varied. This device also enables the value of the excitation resistance 4' which corresponds to a particular position of the engine governor 17 to be altered.

It will be appreciated that the above description is by way of example only and that modifications may be made within the scope of the invention.

I claim:

1. In a Diesel-electric locomotive, in combination a Diesel engine, a generator driven by said Diesel engine, an auxiliary excitation generator connected to said generator driven by said Diesel engine, a variable resistance in the circuit of said excitation generator and a power-operated piston actuating said variable resistance and controlled by a valve having two regulating members one of which is operated automatically in accordance with the speed of the vehicle and the other of which is operated by the said speed governor of said Diesel engine.

2. A Diesel-electric locomotive as set forth in claim 1 in which means are provided for adjusting the value at which the tractive effort of the vehicle is maintained substantially constant.

3. In a Diesel-electric locomotive, in combination a Diesel engine, a generator driven by said Diesel engine, an auxiliary excitation generator, connected to said generator driven by said Diesel engine a variable resistance in the circuit of said excitation generator and a power-operated piston actuating said variable resistance and controlled by a valve, said valve consisting of a sleeve connected to an electromagnet arranged in series with said traction motors and a piston slidably arranged in said sleeve and connected to a floating lever the ends of which are connected to said power-operated piston and to a double armed lever pivoted to a hand-operated adjusting device and operatively connected to a piston of a fluid-operated device the piston rod of which is connected, by means of a pivotally arranged lever, to said governor of said Diesel engine, the arrangement being such that said speed governor regulates the position of the pivotal point of said floating lever.

4. In a Diesel-electric locomotive, in combination a Diesel engine, a generator driven by said Diesel engine, an auxiliary excitation generator connected to said generator driven by said Diesel engine, a variable resistance in the circuit of said excitation generator, means for actuating said variable resistance, said means controlled by several regulating members one of which is operated automatically in accordance with the speed of the vehicle and the other of which is operated by a speed governor of said Diesel engine.

CHARLES SCHAER.